United States Patent Office 2,914,467
Patented Nov. 24, 1959

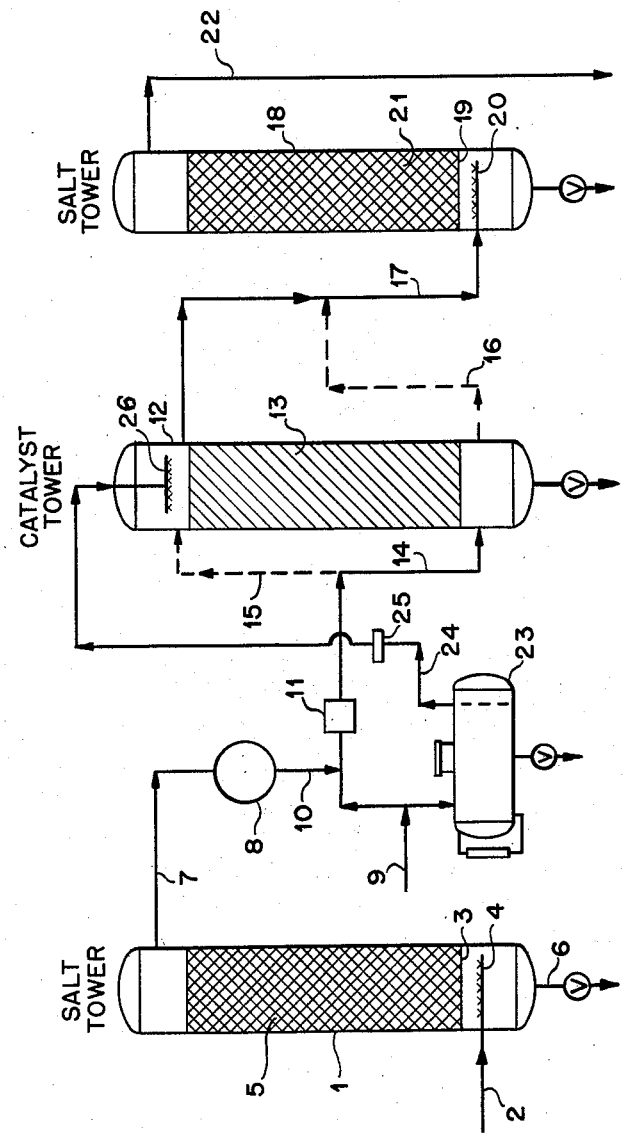
Carl F. Cross
INVENTOR.

2,914,467

SWEETENING PROCESS INCLUDING REACTIVATION OF COPPER CHLORIDE CATALYST

Carl F. Cross, Griffith, Ind., assignor to Sinclair Refining Company, New York, N.Y., a corporation of Maine Application July 26, 1956, Serial No. 600,207

2 Claims. (Cl. 208—195)

My invention relates to the treatment of petroleum distillates with copper chloride catalysts.

Petroleum distillates, for example, gasoline, naphthas, kerosene, and jet fuels, containing undesirable, odorous mercaptans can be sweetened by the well known process of converting the mercaptans to odorless disulfides by treatment with a copper chloride catalyst. The catalyst can be in the form of a liquid, slurry or solid. The reactions are:

(1) 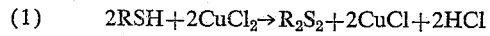
$$2RSH + 2CuCl_2 \rightarrow R_2S_2 + 2CuCl + 2HCl$$

The cupric chloride can be regenerated from the cuprous chloride and hydrochloric acid formed in the above reaction by contacting with oxygen in the form of air as follows:

(2) 
$$4CuCl + 4HCl + O_2 \rightarrow 4CuCl_2 + 2H_2O$$

The treatment is carried out usually in treating towers. In a solid catalyst operation, cupric chloride is absorbed on a suitable carrier, e.g., Olmstead earth, to provide a solid bed. It has been observed that some commercial copper chloride treating towers utilizing solid catalyst beds fail to function properly after a period of continuous operation, for example, three or four months. When this occurs, the general practice is to shut down the treating tower, discard the used catalyst and recharge the tower with new catalyst, a costly operation.

I have found that the activity of the catalyst can be efficiently and economically restored without removal of the catalyst from the tower by contacting the solid catalyst bed with an aqueous solution of cupric chloride in the presence of the petroleum distillate while the unit is in operation, thus avoiding the necessity of discontinuing operation to restore the activity of the catalyst. The cupric chloride is selectively absorbed on the catalyst carrier, e.g. clay, in preference to remaining with the petroleum distillate. The solution is added in an amount sufficient to restore substantial activity to the catalyst. Generally, no more than about 25 weight percent of cupric chloride based on the cupric chloride content of the spent catalyst is required but more can be added if desired. Twenty-five weight percent of cupric chloride amounts to not more than about 60 weight percent of solution when the solution contains about 40 to 60 weight percent of cupric chloride. Preferably, the added solution is a saturated solution so as to avoid the presence of too much water which causes packing or mudding of the tower.

By the process of my invention, the down time for the unit is decreased, labor and material costs for catalyst removal and replacement are decreased and better control of product quality and catalyst activity is obtained.

The process of my invention will be further illustrated by reference to the accompanying drawing which is a flow diagram of a fixed bed cupric chloride catalyst treating unit.

The sour hydrocarbon feed stock free of hydrogen sulfide enters the primary salt tower 1 through line 2 below a steel grid 3 and through a distribution ring 4. The feed stock slowly rises through the salt bed 5 where excess moisture in the stock is absorbed. The coalescence of water by the salt causes formation of salt water which falls to the bottom of the tower 1 from where it is drained periodically through line 6 to the sewer. The stock emerges from the tower saturated with water at the exit temperature, since essentially only the suspended water is removed, leaving the dissolved water in the stock.

The stock after drying in the primary salt tower 1 passes through line 7 to a preheater 8 where the stock is generally preheated by steam. It has been noted (Equation 2 above) that water is formed in the regeneration of the cupric chloride. The main purpose of preheat is to increase the solubility of water in the stock so that water formed in regeneration can be removed from the copper chloride bed in the copper chloride tower.

Air or oxygen is fed through line 9 into the preheated stock in line 10 which flows through a line mixer 11 for dispersion of the air or oxygen in the hydrocarbon before entering the copper chloride treating tower 12 for regeneration of the catalyst.

The copper chloride tower 12 contains a solid catalyst bed 13 of cupric chloride on a suitable carrier and is arranged for either upflow or downflow of the stock coming from the preheater, depending on whether it is introduced by line 14 or line 15. It has been found more satisfactory to operate the copper chloride tower on upflow, since on downflow the tower may become air-bound to such an extent that the hydrocarbon liquid level in the tower is near the bottom outlet line 16. The feed entering the copper chloride tower 12 after the preheater 8 is contacted with the copper chloride catalyst, and the mercaptans which are present in the stock are converted to disulfides by the reaction shown in Equation 1 above.

The cuprous chloride and hydrochloric acid are reconverted to the cupric chloride by the addition of oxygen in the form of air to the catalyst bed as shown in Equation 2 above. As noted above, the air for regeneration is added to the stock by line 9 ahead of the inlet to the copper chloride tower. The conditions of operation of the treating system are well known. Generally, it is practical to make oxygen additions based on the rule that the theoretical $O_2$ required/bbl. treated/hour is equal to 0.01 cubic feet/mg. mercaptan sulfur/100 ml. sour stock. It has been found by actual operation of commercial copper chloride treating towers that it is often necessary to feed as much as 1.5 times the theoretical air or oxygen required to obtain regeneration of the copper chloride catalyst.

The desirability of employing an excess of air or oxygen can be seen in Equation 2 above, since the regeneration reaction requires the immediate presence of oxygen as soon as hydrogen chloride is liberated; otherwise the hydrogen chloride may be carried out of the copper chloride tower causing corrosion difficulties. Also, if hydrogen chloride does leave the tower, the parent cupric chloride molecule from which it came will not be regenerated. Thus, the bed will gradually lose activity as it will be converted to the cuprous chloride. For these reasons, the air or oxygen should never be completely cut out of the tower, and should generally be kept in the calculated range for the mercaptan content and throughput of the stock being treated.

The sweetened stock is taken from the copper chloride tower 12 by line 17 and enters the final salt tower 18 below a steel grid 19 through a distribution ring 20 and slowly rises through the salt bed 21 where excess moisture in the stock is absorbed. The sweetened stock leaves the salt tower 18 by line 22 to finish storage.

When, usually after several months operation, the catalyst unit fails to function properly, the catalyst is fortified by treating it with an aqueous solution of cupric chloride. The solution can be first admixed with the charge stock and the mixture charged to the catalyst bed or they can be separately charged to the bed so that the solution contacts the catalyst in the presence of the feed stock. In either method, the unit continues operation. Preferably, the fortification is carried out by first reversing the flow of stock in the copper chloride catalyst tower 12 from upflow to downflow. The hydrocarbon stock and air or oxygen feed to the tower 12 are preferably reduced while introducing the solution to avoid channeling in the catalyst bed 13 and to obtain better absorption. The booster-charge of aqueous cupric chloride solution is then air pressure fed from the flow case 23 through line 24 containing a flow meter 25 into the topside of the tower 12 through a distribution ring 26 above the catalyst bed 13. The preferred rate of adding the solution is about 0.2 to 1 volume percent based on the hydrocarbon feed. When the addition of the booster-charge solution has been completed, the catalyst tower 12 is returned to upflow operation and the feed is adjusted to normal operating rates.

The copper chloride catalyst which is fortified by the process of my invention is prepared usually by mixing a solution of cupric chloride and water with a solid absorbent carrier material, e.g., Olmstead earth. Generally, proportions of about 0.3:0.3:1 of cupric chloride, water and carrier are used. A 16–30 mesh carrier is advantageous.

The process of my invention will be further illustrated by reference to the following example. An experimental run was made in laboratory equipment to simulate commercial treating conditions. The laboratory equipment consisted of a 1¼" diameter glass tower and a feed pump. The glass tower was charged with 100 grams of discarded copper chloride catalyst of the type described above from a commercial unit. Straight run solvent containing 6 mgs. of mercaptan sulfur per 100 ml. was fed up-flow through the treating catalyst bed at the rate of 20 bbls. per ton of catalyst per hour. The treating temperature was 80° F. "Doctor Tests" and "Copper Tests" (diphenylthiocarbazone test for copper) on the treated product from the laboratory treating tower were positive, indicating the spent nature of the catalyst. Also, positive tests were obtained on the product from the commercial unit when the catalyst was considered spent.

At this point the feed to the laboratory treating tower was reversed from upflow to downflow. A booster charge of 50 percent water and 50 percent cupric chloride was then fed to the top-side of the catalyst bed at the rate of 2 ml. per hour until 7.5 ml. of the cupric chloride-water solution was fed. The cupric chloride content of this amount of solution fed is equal to one-sixth of the original cupric chloride charge to the earth carrier. By visual observation it was noted that this amount of booster-charge traveled two-thirds the depth of the catalyst bed before it was completely absorbed on the earth carrier. After the addition of the booster-charge, the treating tower was placed on upflow. "Doctor Tests" and "Copper Tests" on the treated product were negative, showing that a booster-charge of aqueous cupric chloride extends the life of the treating catalyst.

I claim:

1. In a process for sweetening petroleum distillates wherein a sour distillate is contacted with a solid catalyst bed comprising copper chloride on a solid absorbent carrier to convert mercaptans to disulfides, the method of restoring the activity of a spent catalyst which comprises contacting the spent solid catalyst bed in the presence of the petroleum distillate with an aqueous solution of cupric chloride in an amount sufficient to restore activity to the catalyst.

2. In a process for sweetening petroleum distillates wherein a sour distillate is contacted with a solid catalyst bed comprising copper chloride on a solid absorbent carrier to convert mercaptans to disulfides, the method of restoring the activity of a spent catalyst which comprises contacting the spent solid catalyst bed in the presence of the petroleum distillate with an aqueous solution of cupric chloride, the cupric chloride being added in an amount of not more than about 25 weight percent of the cupric chloride content of the spent catalyst.

References Cited in the file of this patent

UNITED STATES PATENTS 2,727,851  Krause _____ Dec. 20, 1955

OTHER REFERENCES

Kalichevsky: "Sweetening and Desulfurization of Light Petroleum Products," Petroleum Refiner, vol. 30, No. 3, March 1951, pages 122–125.